March 21, 1961  J. M. TOTTON, JR  2,976,077
VEHICLE STABILIZING MEANS
Filed Jan. 17, 1957  2 Sheets-Sheet 1

JOHN MOSLEY TOTTON, JR.
INVENTOR.

BY Robert A. Spray

March 21, 1961  J. M. TOTTON, JR  2,976,077
VEHICLE STABILIZING MEANS
Filed Jan. 17, 1957  2 Sheets-Sheet 2
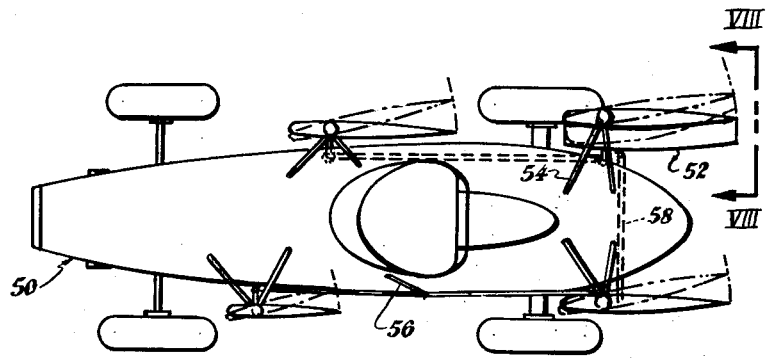
FIG. 5
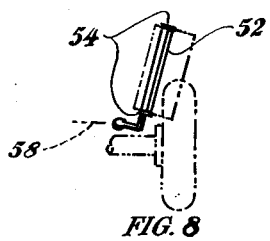
FIG. 8
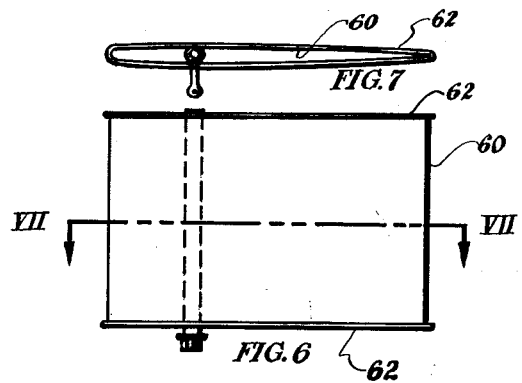
FIG. 7
FIG. 6
JOHN MOSLEY TOTTON, JR.
INVENTOR.
BY Robert A. Spray

2,976,077

VEHICLE STABILIZING MEANS

John Mosley Totton, Jr., R.R. 1, Solsberry,
Greene County, Ind.

Filed Jan. 17, 1957, Ser. No. 634,798

2 Claims. (Cl. 296—1)

This invention relates to vehicles, with particular reference to automotive vehicles commonly known as race cars or racing cars.

At the high speeds desired of race cars, the effects of centrifugal force as the car rounds a curve are tremendous. Skids, slides, spins, fish-tailing are unfortunate results of the effect of this force. And since the banking of the curved portions of most race tracks is much less than that which would be required to permit full-speed turns, it is necessary that drivers reduce their speed significantly to effect the turns safely.

The slow-down during turns, from the relatively great speeds along the straightaway, is so significant that it is regarded as a major factor in overall lap average, and is considered to be the critical factor in many race situations.

Besides slowing down the overall speed, the curve problem also presents other difficulties. The slow-downs require much use of the vehicle brakes, causing unnecessary wear, and unfortunate accidents due to brake failure occasioned by that wear.

Moreover, tire wear is aggravated in turns. Skids, either the relatively controlled type or the more dramatic uncontrolled long skids, cause undue tirewear. Further, excessive stress is imposed on the tire walls during curves, for the unopposed centrifugal force acts through the car axles to exert a significant moment of force about the tire tread contacting the ground. The effect of this is to cause the inner portions of the tire to roll toward the outside of the curve, creating great stresses in the tires.

Furthermore, the unending succession of curves to be effected during a race, with the significant slow-down now necessary in effecting each turn, results in an increased power requirement and fuel consumption to obtain the desired fast acceleration following each slow-down.

It is, accordingly, an object of the present invention to provide novel means providing control of a race car, particularly in the making of a curve at high speed, permitting higher safe turning speeds for the car, by opposing the centrifugal force acting through a curve.

More particularly, it is an object of my invention to provide novel control means in the form of an air-stream impingeable fin arrangement, movable at the will and under the control of the vehicle operator.

Another object is to provide a novel control fin arrangement, adapted to utilize the large relative movement of the vehicle and surrounding air, to effect a lateral force to stabilize the vehicle in making a curve at high speed, with the fin arrangement being movable at the will of the operator to effect car-stabilization in accordance with factors of speed, turn radius and banking, and other track and car conditions.

A further object of this invention is to provide new and improved operator-controllable means for achieving stability for a race car, particularly in making a curve at high speed, utilizing the car speed to achieve the stabilizing force.

In carrying out my invention in an illustrative embodiment, I provide a movable stabilizing means, such as an arrangement of one or more vertically extending fin-like members, mounted on the associated race car for controlled swinging movement about a vertically extending axis. Actuating means, operable by the car driver, provide controlled moving of the fin members between a normal longitudinally extending position of minimum air resistance and a transversely extending position in which the fin members are presented in the path of the air stream about the car, providing that the high relative movement of the air stream and fin members acts on them to give a lateral force thrust to stabilize the car. This lateral stabilizing force opposes the centrifugal forces encountered in rounding a curve, thereby permitting faster yet safer turns, reducing wear on brakes and tires, and giving better overall performance.

These and other objects, features, and advantages of the present invention will be further apparent from the following description of illustrative embodiments thereof, taken in conjunction with the accompanying drawings, in which:

Fig. 5 is a plan view illustrating a fin arrangement according to another modification, with one of the fins inclined to the vertical;

Fig. 6 is an enlarged elevational view of an illustrative fin;

Fig. 7 is a sectional view of the fin according to Fig. 6, the section being taken along the line VII—VII of Fig. 6; and Fig. 8 is an end elevational view of the inclined fin illustrated in Fig. 5.

Figure 1:
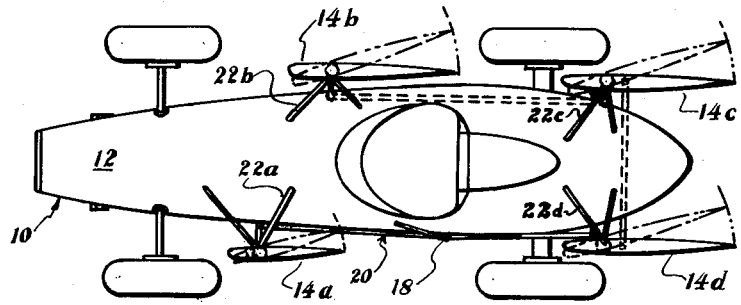
Fig. 1 is a plan view of a race car provided with a driver-controlled fin arrangement according to one embodiment.

According to my invention as illustrated in the drawings, I provide a new and useful stabilizing means, comprising a driver-controllable movable fin arrangement adapted to be moved as desired into a laterally extending position in the air stream about the car, there to be acted upon by the relative movement of the air and car to advantageously stabilize the car.

Figure 2:
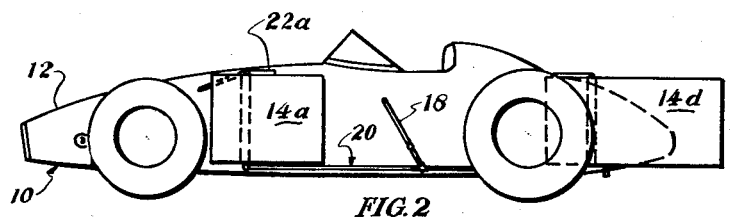
Fig. 2 is an elevation thereof.
Figure 4:
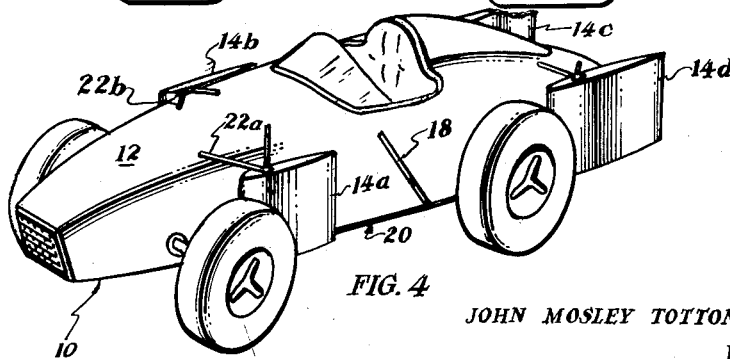
Fig. 4 is a pictorial illustration of a racing car embodying my invention, according to the embodiment illustrated in Figs. 1 and 2.

As shown in Figs. 1, 2, and 4, a racing car 10 having a car body 12 is provided with a control fin arrangement according to one embodiment of my invention.

This arrangement includes a plurality of wind-impingeable members or fins 14a, 14b, 14c, and 14d, vertically mounted and shown located in selected desired positions about the car body 12.

In this embodiment as shown, fin 14a is mounted along a side of the body 12 rearwardly adjacent the front axle; fin 14b is mounted along a side of the vehicle intermediate of and substantially spaced from the front and rear axles; and fins 14c and 14d are mounted on the sides of the body rearwardly of the rear axle.

According to this invention, the fins are movable, under control of the vehicle operator, between a normal longitudinally extending position, as shown in full lines, and a transversely extending position, as shown in chain lines. In the transversely extending position, they are presented in the path of the air stream about the vehicle.

In that position, extending into the air stream, they are acted upon by the impinging air to obtain a lateral stabilizing thrust force to stabilize the car.

To control movement of the fins, means such as an operator-manipulatable control means is provided. As shown, this includes a lever 18 which acts through a linkage 20 to swing the fins about their respective body-mounting brackets 22a, 22b, 22c, and 22d, between the normal and wind-engaging positions.

Greatly advantageous lateral stabilizing thrust is achieved by this invention, and it is controlled by the vehicle operator. As has been pointed out, this stabilizing thrust is of great significance in bettering car performance, permitting faster curves safely, and otherwise improving performance.

Particularly significant is that the fin-movement is under the control of the vehicle operator. Accordingly, he can regulate fin-movement with due consideration of speed, turn radius and banking, and other car and track conditions encountered.

It will be noted that the fins are mounted at least substantially wholly below the cowling line of the vehicle, the "cowling" being the covering sheeting of the vehicle which encloses the engine and other functional mechanisms of the vehicle.

Figure 3:
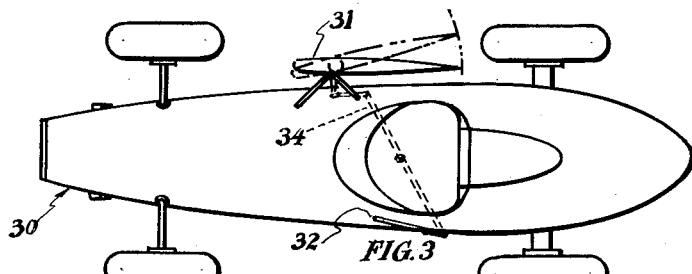
Fig. 3 is a plan view similar to Fig. 1, but illustrating a modified fin arrangement.

Fig. 3 illustrates a car 30 having an alternative arrangement utilizing a side fin 31, similar to the side fin 14b of the preceding embodiment. Control means such as a lever 32 and linkage 34 permit the vehicle operator to control movement of the fin 31 as desired.

One or more of the fins may desirably be mounted so that in its transversely extending position it lies in a plane inclined to the vertical, achieving a lifting component as well as a lateral thrust.

Accordingly, Figs. 5 and 8 illustrate such an arrangement. As there shown, a car 50 has a fin 52 mounted as by brackets 54 for swinging movement about an axis inclined to the vertical, outwardly from the vehicle.

In this embodiment, the vehicle operator manipulates a control lever 56 to move a linkage 58 to effect movement of the inclined fin 52, from the normal longitudinal position shown in full lines to the transversely extending position shown in chain lines, to achieve desired lateral thrust, here including a lifting component, to obtain the desired stability. This lifting component helps overcome the tendency of the car to roll over during a curve, and is achieved by the fact that rotation of the fin about an inclined axis presents the trailing edge of the fin lower than the leading edge thereof.

A further feature of the present invention is illustrated with the fin 60 shown in Figs. 6 and 7. As there shown, a rib means such as a rib 62 is provided to extend along an edge of the fin, restricting air sweep over the edge. Such a rib is here shown as provided along both the upper and lower edges of the fin 60.

It will thus be seen from the foregoing description of my invention according to these illustrative embodiments, considered with the accompanying drawings, that the present invention provides a new and improved stabilizing means having the desired advantages and characteristics and accomplishing its intended objects, including those hereinbefore pointed out and others which are inherent in the invention.

I claim as my invention:

1. Control means for an associated vehicle, comprising a controllable fin arrangement adapted for movement between a longitudinally extending position and a protruding position presented in the path of the air stream about the vehicle, said fin arrangement including a fin member swingable about an axis outwardly inclined from the vehicle, and means actuatable by the vehicle operator for effecting said movement of the fin member.

2. Control fin means for stabilizing an associated vehicle, comprising a fin member adapted to be carried along each side of the vehicle rearwardly of the rear axle thereof, one of said fin means being mounted for swinging movement about an axis outwardly inclined from the vehicle, and means actuatable by the vehicle operator for moving both of said fin members in a common direction into a laterally extending position protruding into the path of the air stream about the vehicle, giving a substantial lateral stabilizing force, and a lifting component to help overcome tendency of the vehicle to roll over during a curve.

References Cited in the file of this patent

UNITED STATES PATENTS

| 1,138,724 | Boughton | May 11, 1915 |
|---|---|---|
| 1,266,191 | Adsit | May 14, 1918 |
| 1,437,183 | Johnson | Nov. 28, 1922 |
| 1,913,809 | Lanier | June 13, 1933 |
| 1,989,733 | Bell | Feb. 5, 1935 |
| 2,665,137 | Kamm | Jan. 5, 1954 |

FOREIGN PATENTS

| 887,384 | France | Nov. 11, 1943 |
|---|---|---|
| 652,590 | Great Britain | Apr. 25, 1951 |
| 713,277 | Great Britain | Aug. 11, 1954 |
| 258,173 | Italy | Apr. 7, 1928 |
| 485,712 | Italy | Oct. 17, 1953 |